United States Patent [19]

Spranger

[11] 4,231,879
[45] Nov. 4, 1980

[54] APPARATUS FOR SELECTIVE SEPARATION OF MATTER THROUGH SEMI-PERMEABLE MEMBRANES

[75] Inventor: Kurt Spranger, Ammerbuch-Entringen, Fed. Rep. of Germany

[73] Assignee: Gambro Dialysatoren GmbH & Co. KG, Fed. Rep. of Germany

[21] Appl. No.: 951,314

[22] Filed: Oct. 13, 1978

[30] Foreign Application Priority Data

Oct. 17, 1977 [SE] Sweden ............................ 7711630

[51] Int. Cl.³ ........................................... B01D 31/00
[52] U.S. Cl. ............................ 210/321 B; 210/321 R
[58] Field of Search ............... 210/252, 321 R, 321 A, 210/321 B, 433 M, 456, 323 T; 422/48; 55/158

[56] References Cited

U.S. PATENT DOCUMENTS

| | | | |
|---|---|---|---|
| 3,211,645 | 10/1965 | Ferrari ............................ | 210/321 A |
| 3,342,729 | 9/1967 | Strand ............................ | 210/321 |
| 3,485,374 | 12/1969 | Manjikian et al. ............... | 210/433 M |
| 3,704,223 | 11/1972 | Dietzsch et al. ................. | 210/500 M |
| 3,993,816 | 11/1976 | Baudet et al. ..................... | 210/22 R |
| 4,038,190 | 7/1977 | Baudet et al. ..................... | 210/321 B |
| 4,038,191 | 7/1977 | Davis et al. ....................... | 210/321 B |
| 4,039,455 | 8/1977 | Bardin et al. ..................... | 210/321 A |
| 4,054,527 | 10/1977 | Esmond ............................ | 210/321 B |
| 4,124,510 | 11/1978 | Joh .................................... | 210/321 B |
| 4,127,481 | 11/1978 | Malchesky et al. ............... | 210/22 A |

FOREIGN PATENT DOCUMENTS

| | | | |
|---|---|---|---|
| 2514763 | 10/1975 | Fed. Rep. of Germany ...... | 210/321 A |
| 2222134 | 10/1974 | France ................................ | 210/433 M |
| 5233888 | 3/1977 | Japan .................................. | 210/321 B |

*Primary Examiner*—Charles N. Hart
*Assistant Examiner*—David R. Sadowski

*Attorney, Agent, or Firm*—Lerner, David, Littenberg & Samuel

[57] ABSTRACT

Apparatus for selectively separating matter between a first fluid and a second fluid through semi-permeable membranes. The apparatus comprises a plurality of elongated frame assemblies, each of which define an elongated contact chamber for the second fluid. A plurality of tubular semi-permeable membrane for the first fluid are disposed in each of the contact chambers of the frame assemblies. The plurality of elongated frame assemblies are stacked together with the elongated contact chambers thereof being in side by side relationship. Fluid communication means are provided for the stacked frame assemblies for providing fluid communication between the contact chambers of the frame assemblies through which the second fluid is adapted to be conducted. Sealing means are provided for sealing the tubular semi-permeable membranes from the contact chambers so that there is no contact between the first and second fluids. Further, a pair of cover plates are provided for the stacked frame assemblies and a first and a second end fitting are provided for the ends of the stacked frame assemblies. At least one of the end fittings includes means for clamping the frame assemblies between the pair of cover plates to hold the frame assemblies together. Inlet and outlet means are provided for the first fluid for introducing the first fluid into the tubular semi-permeable membranes and for withdrawing the first fluid therefrom, and inlet and outlet means are provided for the second fluid for introducing the second fluid into at least one of the contact chambers and for withdrawing the second fluid therefrom after the second fluid has been conducted substantially throughout the contact chambers of the stacked frame assemblies around the tubular semi-permeable membranes to selectively separate the matter between the first and second fluids.

20 Claims, 5 Drawing Figures

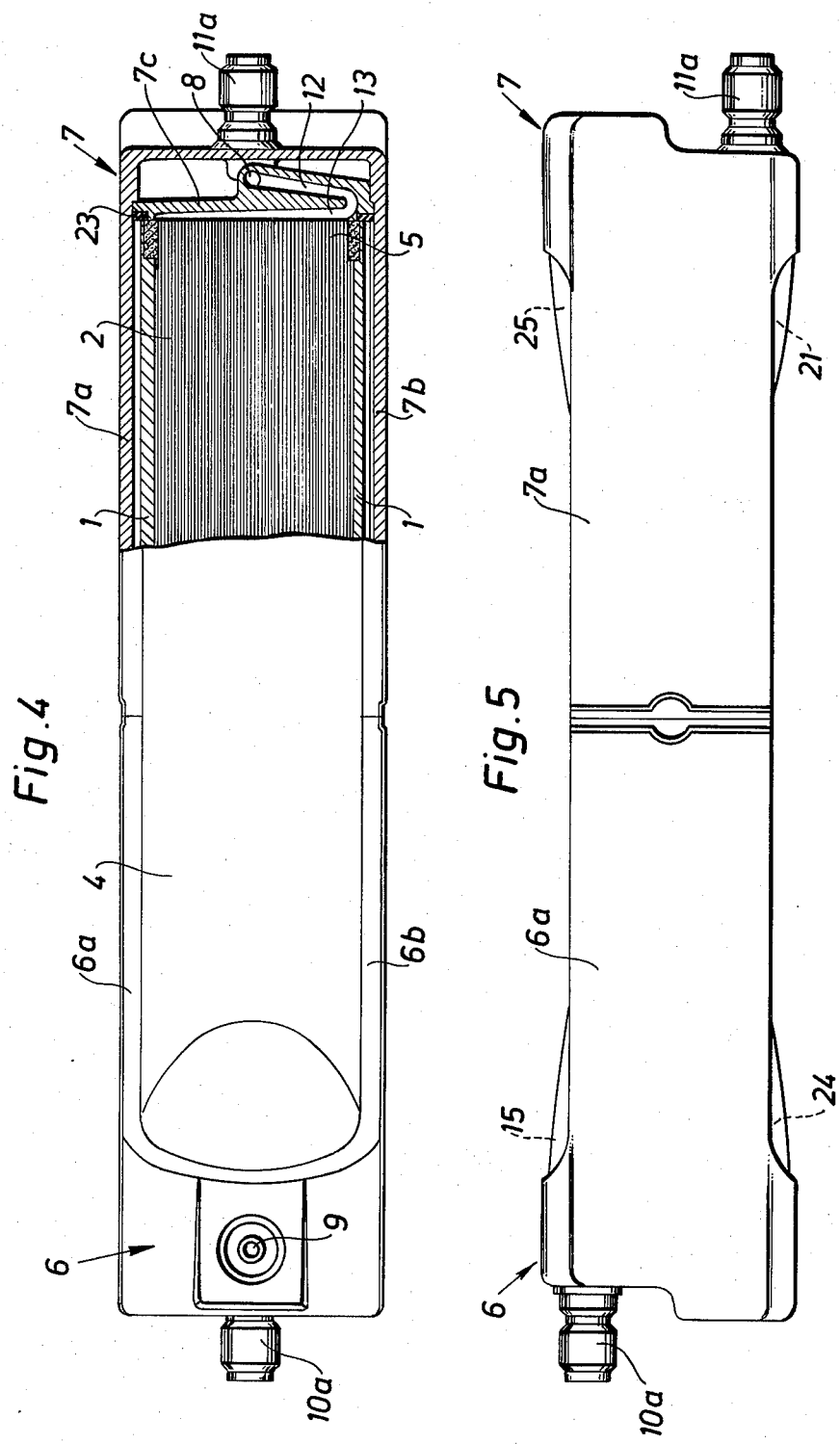

APPARATUS FOR SELECTIVE SEPARATION OF MATTER THROUGH SEMI-PERMEABLE MEMBRANES

BACKGROUND OF THE INVENTION

The present invention relates generally to apparatus for selectively separating matter between two fluids utilizing semi-permeable membranes, and more particularly, to apparatus in which the membranes have the shape of thin walled tubes through which one of the fluids is intended to flow. Still more particularly, the present invention relates to such an apparatus in which the tubes are surrounded on their outer surface by the other fluid, and in which collective inlets and outlets are provided for the respective fluids.

It has been known in the past to utilize semi-permeable membranes to facilitate the diffusion and/or filtration of matter between two fluids therethrough. For example, such membranes are particularly useful in artificial kidney devices for blood purification, as well as in diafiltration and ultrafiltration devices. From patents such as U.S. Pat. Nos. 3,728,256 and 4,038,190 as well as other patents, it is known to utilize arrangements in which a plurality of tubular semi-permeable membranes are provided in two or more separate chambers connected to one another. In such arrangements, the first fluid passes through the semi-permeable membranes and the second fluid is arranged to pass through the separate chambers around the outer surface of the tubular membranes to selectively separate the matter between the first fluid and the second fluid through the membranes.

The search has, however, continued for improved devices for selective separation of matter between fluids. In particular, the search has continued for such devices which are suitable for mass production while at the same time maintain and/or improve the good flow conditions of the respective fluids which are characteristic of such known devices. In particular, the search has continued for apparatus which, in addition to maintaining or improving the good flow conditions to the respective fluids, provides for tight and effective sealing of the various flow paths for the different fluids, and consequently, will insure safe and improved operation.

SUMMARY OF THE INVENTION

In accordance with the present invention, these and other objects have been met by providing an apparatus for selective separation of matter between first and second fluids. In particular, the apparatus according to the present invention comprises a plurality of elongated frame assemblies each of which defines an elongated contact chamber for the second fluid, and a plurality of tubular semi-permeable membranes for the first fluid disposed in each of the contact chambers of the frame assemblies. The frame assemblies are stacked together so that the elongated contact chambers are arranged in side by side relationship. Fluid communication means are provided for the stacked frame assemblies for providing fluid communication between the contact chambers through which the second fluid is adapted to be conducted. Sealing means are provided for sealing the semi-permeable membranes from the contact chambers so that there is no contact between the first fluid and the second fluid. A pair of cover plates are provided for the stacked frame assemblies and first and second end fittings are provided for the ends of the stacked frame assemblies. At least the first end fitting includes means for clamping the frame assemblies between the pair of cover plates to hold the frame assemblies together. Inlet and outlet means are provided for the first fluid for introducing the first fluid into the tubular semi-permeable membranes and for withdrawing the first fluid after conduction therethrough. Further, inlet and outlet means are provided for the second fluid for introducing the second fluid into at least one of the contact chambers and for withdrawing the second fluid from one of the contact chambers after the second fluid has been conducted substantially throughout the contact chambers of the stacked frame assemblies around the tubular semi-permeable membranes to selectively separate the matter between the first and second fluids.

The end fittings for the stacked frame assemblies provide a convenient means for insuring that the frame assemblies are tightly clamped together to maintain the integrity of the apparatus, and in particular, a tight and effective sealing of the various flow paths. At the same time, the provision for separate elongated frame assemblies in each of which there is disposed a plurality of tubular semi-permeable membranes allows for suitable mass production of the apparatus with subseqent ease in assembling thereof to ensure suitable flow conditions for the respective fluids and to ensure safe operation of the apparatus.

In a preferred embodiment of the present invention, both of the end fittings serve to clamp the frame assemblies between the pair of cover plates. In a still further preferred embodiment, each of the end fittings includes elongated legs which extend along the elongated sides of the stack of frame assemblies and which engage the pair of cover plates to hold the cover plates together. By having the elongated legs of each of the end fittings extend approximately to the center of the stacked frame assemblies, adequate clamping force can be provided along the entire elongated length of the stacked frame assemblies to ensure the integrity of the apparatus.

According to a further preferred embodiment, each of the cover plates is transparent so that any leakage between the two fluids can be readily detected.

According to a still further preferred embodiment of the apparatus of the present invention, the individual frame assemblies define intermediate flow channels between adjacent contact chambers so that a pure countercurrent flow of the second fluid through the contact chambers may be achieved. In the preferred embodiment, the intermediate flow channel is defined by an intermediate wall of the frame assemblies and a removable cover plate disposed between adjacent frame assemblies, fluid communication openings being provided in the intermediate wall and in the cover plate so that the second fluid may be conducted in series through the contact chambers in a first direction and then through the intermediate flow chambers in the opposite direction.

These and other advantages of the present invention will be apparent from the following detailed description in which reference is made to the enclosed drawings which illustrate the preferred embodiment of the present invention.

BRIEF DESCRIPTION OF THE DRAWINGS

FIG. 4 is a plan view, partly in section, of the apparatus of the present invention; and FIG. 5 is a side view of the apparatus of the present invention.

DETAILED DESCRIPTION OF THE PREFERRED EMBODIMENT

Figure 1:
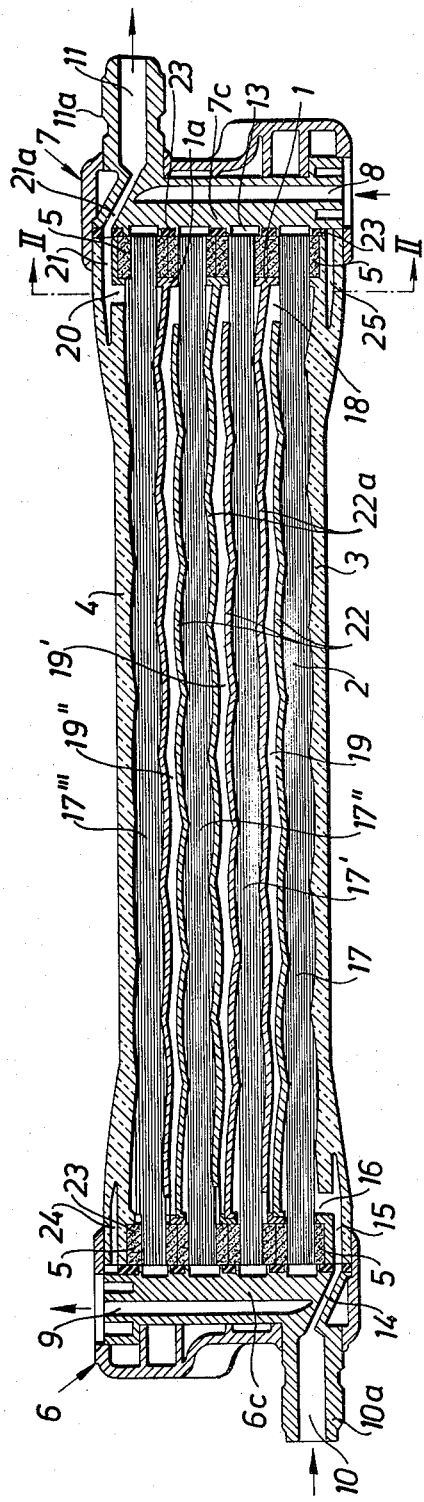
FIG. 1 is a longitudinal sectional view of the apparatus in accordance with the present invention.
Figure 3:
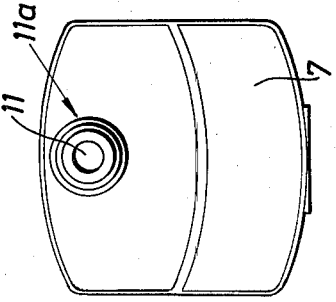
FIG. 3 is an end view of the apparatus of the present invention.

Turning now to the drawings in which like reference characters represent like elements, there is shown generally an apparatus for selective separation of matter through semi-permeable membranes. The apparatus in accordance with the present invention is intended mainly for use as an artificial kidney for obtaining blood purification. The present invention will therefore be described in the following with reference to such a use of the apparatus. However, it will be clear to those versed in the art that the construction of the apparatus of the present invention can also be used for processes other than the dialysis of patients suffering from kidney disease. For example, it may be used for similar processes such as diafiltration or ultrafiltration. With such other uses, one of the inlets for one of the fluids may be omitted if desired. Further still, the present invention may be used in connection with the treatment for failure of the liver, pancreas, and other organs. Still further, the apparatus in accordance with the present invention may be used as an oxygenizer wherein one of the fluids consists of blood while the other consists of oxygen or an oxygen mixture.

Accordingly, in the description herein, selective separation of matter is used to designate any of the processes referred to hereinabove, and in particular, to encompass the processes of diffusion, ultrafiltration, and/or diafiltration. Further, fluid is intended in its broad sense to encompass both gases as well as liquids.

Figure 2:
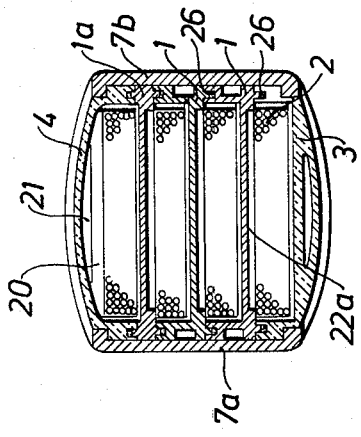
FIG. 2 is a sectional view taken along lines 2—2 of FIG. 1.

The apparatus as shown in FIGS. 1 and 2 is comprised of a number of separate frame assemblies 1 each of which is provided with a cluster or mass of tubular semi-permeable fibers or membranes 2 arranged therein. The frame assemblies 1 are arranged between a first outer cover plate 3 at the bottom of the apparatus as shown in FIG. 1, and a second outer cover plate 4 arranged on the opposite or top side of the stacked assemblies 1. The designations bottom plate and top plate refer to the position as shown in FIGS. 1 and 2. However, it will be clear to those skilled in the art that the construction as shown is operable irrespective of position. In fact, it is preferable that the apparatus be arranged in a vertical position during operation thereof.

The individual tubular semi-permeable membranes or fibers of the cluster of fibers 2 are cast into blocks 5 of sealing compound at their opposite open ends. For example, the blocks 5 of sealing compound may be comprised of polyurethane which surround and maintain the individual fibers 2 spaced apart.

The individual frame assemblies 1 are each designed to hold the blocks 5 of sealing compound to maintain the fiber clusters 2 in a contact chamber or zone 17 defined in the individual frame assemblies 1. Preferably, fiber clusters 2 are held in extension which serves to help maintain the individual fibers 2 apart from one another.

The stack of frame assemblies 1 with the fiber clusters 2 arranged therein are held together, as best seen by comparison between FIGS. 2 and 4, by U-shaped end fittings 6, 7. These end fittings 6,7 are designed with legs 6a, 6b and 7a, 7b respectively which engage and clamp together the outer cover plates 3, 4 to hold the stacked frame assemblies 1 therebetween. The end fittings 6, 7 are provided at the opposite ends of the stack frame assemblies 1. Moreover, the end fittings 6,7 include inserts 6c and 7c respectively, to be described in more detail hereinbelow.

Gaskets 26 are arranged between the individual frame assemblies 1, as well as between the individual frame assemblies 1 and the bottom plate 3 and the top plate 4. It should be noted that the frame assemblies are generally rectangular in shape. Thus, the gaskets 26 are also rectangular in shape and serve to seal the contact chambers of the individual frame assemblies 1 from one another and from the open ends of the tubular semi-permeable membranes 2.

Preferably, the elongated legs 6a, 6b, and 7a, 7b, each extend along the sides of the stacked frame assemblies 1 from the end of the frame assemblies 1 to approximately the center of the stacked frame assemblies 1 so that the elongated legs each cover approximately half the length of the elongated sides of the stack. The legs 6a, 6b, and 7a, 7b thus engage the lower plates 3, 4 along substantially the entire elongated length thereof. Such an arrangement thus provides for an effective tight clamping force along the entire outer periphery of the stacked frame assemblies 1. This in turn results in an even clamping force being applied to the gaskets 26 between the adjacent frame assemblies 1 and between the frame assemblies 1 and the cover plates 3, 4 to insure that the flow paths for the first and second fluids are sealed from one another. The arrangement as shown also provides for a minimum number of separate parts while at the same time providing for similar or identical component parts thereof. Such constructions are very useful for facilitating mass production of the components and assembly thereof into the finished selective separation apparatus.

When the apparatus as shown is designed for use as an artificial kidney, blood is supplied via an inlet 8 in the end fitting 7 and is withdrawn via an outlet 9 in the end fitting 6. In a similar manner, dialysis liquid is supplied via an inlet 10 in the connecting nozzle 10a arranged on the end fitting 6, and dialysis liquid is withdrawn subsequently via an outlet 11 in the outlet nozzle 11a arranged on the end fitting 7.

As best seen in FIG. 4, the blood passes from the inlet 8 via a plurality of parallel distribution ducts 12 connected to corresponding individual distributing chambers 13. The distributing chambers 13 are arranged in front of each of the blocks 5 of sealing compound, i.e., in front of the open ends of the fibers 2 cast into the sealing compound. A distributing duct 12 and individual distributing chamber 13 are provided for each of the frame assemblies 1 of the stacked frame assemblies 1 comprising the apparatus of the present invention. In this way, the first fluid or blood is distributed evenly between the pluralities of semi-permeable membranes 2 of the plurality of separate frame assemblies 1.

The distribution duct 12 and chamber 13 are arranged in the insert 7c of the end fitting 7. The individual chambers 13 are sealed from one another by means of the sealing gaskets 23 arranged between the blocks 5 of sealing compound of the individual frame assemblies 1 and the insert 7c. In this way, the respective blocks 5 are sealed from one another so that the fibers or tubular membranes 2 will communicate only with one of the distributing chambers 13 communicating with the inlet 8 for the first fluid.

Although not shown in FIG. 4, similar individual ducts and chambers are provided in the end fitting 6 for collecting the first fluid after having been conducted through the tubular membranes and for withdrawing same into the outlet 9. These similar collecting ducts and chambers arranged in the insert 6c of end fitting 6, which insert 6c is similar to end fitting insert 7c. Further, separate sealing gaskets 23 are arranged around the respective blocks 5 of sealing compound adjacent the end fitting 6 which are pressed thereagainst by the insert 6c. In this way, the first fluid is evenly distributed between each of the pluralities of semi-permeable membranes 2 of the frame assemblies 1 and is conducted therethrough and collected at the outlet 9.

It is further to be noted that the first fluid is introduced into the end fitting 7 through a duct which is arranged substantially at right angles to the longitudinal direction of the stacked frame assemblies 1. From the central duct 8 the first fluid or blood then communicates with the plurality of distribution ducts and chambers 12, 13 for introducing the first fluid into the open ends of the fibers 2. This arrangement is useful for providing symmetrical flow conditions through each of the fiber clusters 2 arranged in each of the frame assemblies 1. Further, a similar construction is provided for the collective outlets for the first fluid, but arranged in the opposite end fitting 6.

The individual frame assemblies 1 are each U-shaped as are the bottom plate 3 and the top plate 4 (see FIG. 2). Intermediate flow channels or chambers 19, 19', 19'' are defined between cover-like intermediate walls or plates 22 arranged between adjacent frame assemblies 1 and intermediate walls or webs 22a integrally formed on the frame assemblies 1. Appropriate openings, e.g. 18, are provided for providing fluid communication between the contact chambers 17 and the intermediate flow chambers 19 in the stacked frame assemblies 1 so that the flow of the second fluid or dialysis liquid through the contact chambers 17 is always in a direction purely countercurrent to the direction of flow of the first fluid through the tubular membranes 2 whereas the flow through the intermediate flow chambers 19 is in a co-current direction as the flow through the tubular membranes 2. However, during the flow through the intermediate flow chambers 19, the second fluid is not in contact with any semi-permeable membranes 2. Such an arrangement for purely countercurrent flow between the flowing fluids is advantageous for producing good selective separation, and is described in detail in copending application Ser. No. 713,408, filed Aug. 11, 1976.

More particularly, the second fluid or dialysis liquid on the other hand, is supplied, via inlet 10 to a duct 14 in the insert 6c and a duct 15 in the lower plate 3. From the duct 15, the dialysis liquid passes via an inlet 16 into the first contact chamber 17 having the cluster of fibers 2 disposed therein. The dialysis liquid then flows towards the end fitting 7 (i.e., to the right as shown in FIG. 1) in a direction purely countercurrent to the direction of flow through the tubular membranes or fibers 2. The dialysis liquid then flows via an opening 18 into an intermediate flow chamber 19 arranged between the contact chamber 17 of the first frame assembly 1 and a contact chamber 17' of the adjacent frame assembly 1. The dialysis liquid flows toward the end fitting 6 (i.e., to the left as shown in FIG. 1) and into the second contact chamber 17' where dialysis liquid then flows back towards the end fitting 7 in purely countercurrent flow with respect to the first fluid. The dialysis liquid continues to flow in this manner through the series of chambers 17', 17'', 17''' and the intermediate flow chambers or channels 19', 19'' respectively to an outlet 20 arranged in the top cover plate 4. The outlet 20 communicates with an outlet duct 21 in the top cover plate 4 which in turn communicates with a duct 21a in the insert 7c, the duct 21a being similar to the duct 14. The duct 21a in turn communicates with the outlet 11 in the end fitting insert 7c.

It is to be noted that the intermediate webs 22a and the intermediate plates 22 have been profiled so as to produce turbulence or some other kind of vorticity in the dialysis fluid flowing outside of the fibers 2. This is for the purpose of improving the flow conditions for the dialysis fluid. In this regard, each of the walls 22, 22a have a wavy or non-planar configuration as best seen in FIG. 1.

It is to be noted that the inserts 6c and 7c provide a convinent means for assembly of the apparatus in that the collective inlet and collective outlets for the two fluids can be provided in the inserts 6c, 7c themselves which are designed to be pressed tightly against the ends of the stacked frame assemblies 1 by means of the end fittings 7 and 6 which also serve to tightly clamp together the upper and lower cover plates 4, 3.

The outer cover plates 3, 4 respectively are preferably made of a transparent material. This allows for an easier inspection of the fibers 2 in order to detect any leakage between the first and second fluids. If the dummy ducts 24, 25 are provided directly opposite the ducts 15 and 21, a symmetrical design, which is convenient from the point of view of manufacturing in mass, is achieved. In addition, the dummy ducts 24 and 25 provided for a small enlargement which facilitates the inspection of the fibers 2.

The various components of the apparatus of the present invention may be made of plastics or other readily combustible materials which can be easily destroyed after use. This is most important in medical applications so as to avoid the risk of contamination, infection, etc. Finally, it should be noted that the upper most frame assembly 1 closest to the top plate 4 has been given a somewhat different construction and is therefore designated 1a, as noted in FIG. 2.

Thus, it is seen that the present invention provides an improved selective separation apparatus which is suitable for mass production and also which provides for tight and effective sealing of the various flow paths therein. In particular, it is seen that the apparatus of the present invention includes a plurality of separate frame assemblies 1 in each of which are disposed a plurality of clusters of tubular semi-permeable membranes 2. The membranes 2 are adapted to conduct a portion of the first fluid therethrough and are arranged in contact chambers 17 of the frame assemblies 1, the contact chambers 17 being adapted to conduct the second fluid around the tubular membranes. Outer cover plates 3, 4 for the stacked frame assemblies 1 and first and second end fittings 6, 7 are also provided. At least one of the end fittings 6, 7 includes means for clamping the outer cover plates 3, 4 to hold the stacked frame assemblies 1 together.

While the preferred embodiment of the present invention has been described and shown, it will be understood that such is merely illustrative and that changes may be made without departing from the scope of the invention as claimed. Thus, the individual details shown may vary within wide limits without exceeding the cope of the invention. For other similar types of construction containing other details which could be applied to the construction of the apparatus in accordance with the present invention, reference should be made to copending United States patent application Ser. Nos. 951,312 and 951,313 filed on even date herewith.

What is claimed is:

1. Apparatus for selectively separating matter between a first fluid and a second fluid through semi-permeable membranes, said apparatus comprising:

a plurality of elongated frame assemblies each of which has a first end and a second end and each of which defines an elongated contact chamber for said second fluid;

a plurality of tubular semi-permeable membranes for said first fluid for each of said frame assemblies, said pluralities of tubular membranes being disposed in said contact chambers of said frame assemblies;

said frame assemblies being stacked with said elongated contact chambers being in side by side relationship and with said first ends of said frame assemblies arranged at a first end of said stacked frame assemblies and said second ends of said frame assemblies arranged at a second end of said stacked frame assemblies;

fluid communication means for said stacked frame assemblies for providing fluid communication between said contact chambers of said frame assemblies through which said second fluid is adapted to be conducted;

a pair of cover plates for said stacked frame assemblies, said cover plates being disposed on opposite sides of said stacked frame assemblies and each having a first end arranged adjacent said first end of said stacked frame assemblies and a second end arranged adjacent said second end of said stacked frame assemblies;

sealing means for sealing said tubular semi-permeable membranes from said contact chambers so that there is no contact between said first fluid and said second fluid;

a first end fitting encompassing the outer periphery of said stacked frame assemblies at said first end of said stacked frame assemblies and a second end fitting encompassing the outer periphery of said stacked frame assemblies at said second end of said stacked frame assemblies, at least said first end fitting including means for clamping said stacked frame assemblies between said pair of cover plates to hold said stacked frame assemblies together;

inlet means for said first fluid for introducing said first fluid into said tubular semi-permeable membranes and outlet means for said first fluid for withdrawing said first fluid from said tubular semi-permeable membranes;

inlet means for said second fluid for introducing said second fluid into at least one of said contact chambers; and outlet means for said second fluid for withdrawing said second fluid from said contact chambers whereby said second fluid is conducted substantially throughout said contact chambers of said stacked frame assemblies around said tubular semi-permeable membranes supported therein to selectively separate matter between said first and second fluids.

2. Apparatus for selectively separating matter between a first fluid and a second fluid through semi-permeable membranes, said apparatus comprising:

a plurality of elongated frame assemblies each of which has a first end and a second end and each of which defines an elongated contact chamber for said second fluid;

a plurality of tubular semi-permeable membranes for said first fluid for each of said frame assemblies, said pluralities of tubular membranes being disposed in said contact chambers of said frame assemblies;

said frame assemblies being stacked with said elongated contact chambers being in side by side relationship and with said first ends of said frame assemblies arranged at a first end of said stacked frame assemblies and said second ends of said frame assemblies arranged at a second end of said stacked frame assemblies;

fluid communication means for said stacked frame assemblies for providing fluid communication between said contact chambers of said frame assemblies through which said second fluid is adapted to be conducted;

a pair of cover plates for said stacked frame assemblies, said cover plates being disposed on opposite sides of said stacked frame assemblies and each having a first end arranged adjacent said first end of said stacked frame assemblies and a second end arranged adjacent said second end of said stacked frame assemblies;

sealing means for sealing said tubular semi-permeable membranes from said contact chambers so that there is no contact between said first fluid and said second fluid;

a first end fitting encompassing the outer periphery of said stacked frame assemblies at said first end of said stacked frame assemblies and a second end fitting encompassing the outer periphery of said stacked frame assemblies at said second end of said stacked frame assemblies, said first end fitting and said second end fitting each including means for clamping said stacked frame assemblies between said pair of cover plates to hold said stacked frame assemblies together;

first inlet means for said first fluid for introducing said first fluid into said tubular semi-permeable membranes and first outlet means for said first fluid for withdrawing said first fluid from said tubular semi-permeable membranes, said first inlet means being in said first end fitting and said first outlet means being in said second end fitting;

second inlet means for said second fluid for introducing said second fluid into at least one of said contact chambers; and second outlet means for said second fluid for withdrawing said second fluid from said contact chambers whereby said second fluid is conducted substantially throughout said contact chambers of said stacked frame assemblies around said tubular semi-permeable membranes supported therein to selectively separate matter between said first and second fluids.

3. Apparatus for selectively separating matter between a first fluid and a second fluid through semi-permeable membranes, said apparatus comprising:

a plurality of elongated frame assemblies each of which has a first end and a second end and each of which defines an elongated contact chamber for said second fluid;

a plurality of tubular semi-permeable membranes for said first fluid for each of said frame assemblies, said pluralities of tubular membranes being disposed in said contact chambers of said frame assemblies;

said frame assemblies being stacked with said elongated contact chambers being in side by side relationship and with said first ends of said frame assemblies arranged at a first end of said stacked frame assemblies and said second ends of said frame assemblies arranged at a second end of said stacked frame assemblies;

fluid communication means for said stacked frame assemblies for providing fluid communication between said contact chambers of said frame assemblies through which said second fluid is adapted to be conducted;

a pair of cover plates for said stacked frame assemblies, said cover plates being disposed on opposite sides of said stacked frame assemblies and each having a first end arranged adjacent said first end of said stacked frame assemblies and a second end arranged adjacent said second end of said stacked frame assemblies;

sealing means for sealing said tubular semi-permeable membranes from said contact chambers so that there is no contact between said first fluid and said second fluid;

a first end fitting encompassing the outer periphery of said stacked frame assemblies at said first end of said stacked frame assemblies and a second end fitting encompassing the outer periphery of said stacked frame assemblies at said second end of said stacked frame assemblies, said first end fitting and said second end fitting each including means for clamping said stacked frame assemblies between said pair of cover plates to hold said stacked frame assemblies together;

first inlet means for said first fluid for introducing said first fluid into said tubular semi-permeable membranes and first outlet means for said first fluid for withdrawing said first fluid from said tubular semi-permeable membranes, said first inlet means being in said first end fitting and said first outlet means being in said second end fitting;

second inlet means for said second fluid for introducing said second fluid into at least one of said contact chambers, said second inlet means being in said second end fitting; and second outlet means for said second fluid for withdrawing said second fluid from said contact chambers, said second outlet means being in said first end fitting, whereby said second fluid is conducted substantially throughout said contact chambers of said stacked frame assemblies around said tubular semi-permeable membranes supported therein to selectively separate matter between said first and second fluids.

4. The apparatus of claim 3 wherein said stacked frame assemblies include first and second outer frame assemblies of said stacked frame assemblies, and wherein one of said cover plates is disposed adjacent to said first outer frame assembly and the other of said cover plates is disposed adjacent to said second outer frame assembly so that said stacked frame assemblies are stacked between said pair of cover plates.

5. The apparatus of claim 4 wherein said one cover plate adjacent to said first outer frame assembly includes a fluid communication duct for providing fluid communication from said inlet means for said second fluid to said contact chamber of said first outer frame assembly, and wherein said other cover plate adjacent to said second outer frame assembly includes a fluid communication duct for providing fluid communication from said contact chamber of said second outer frame assembly to said outlet means for said second fluid, said fluid communication duct of said other cover plate communicating with said outlet means for said second fluid in said first end fitting and said fluid communication duct of said one cover plate communicating with said inlet means for said second fluid in said second end fitting.

6. The apparatus of claim 5 wherein each of said elongated frame assemblies includes an integral elongated intermediate wall which with its frame assembly defines an elongated intermediate flow chamber separated from said elongated contact chamber of its frame assembly by said elongated intermediate wall, wherein said plurality of semi-permeable membranes are only disposed in said elongated contact chambers, and wherein said fluid communication means for said stacked frame assemblies comprises openings in said intermediate walls to provide fluid communication between said contact chambers and said intermediate flow chambers.

7. The apparatus of claim 6 further including an elongated intermediate plate for each of said intermediate flow chambers, each of said elongated intermediate plates being disposed between said intermediate flow chamber of one of said frame assemblies and said contact chamber of an adjacent frame assembly, and being spaced from said intermediate wall of said one frame assembly, and wherein said fluid communication means further includes openings in each of said intermediate plates for providing fluid communication between said intermediate flow chambers of said one of said frame assemblies and said contact chambers of said adjacent frame assemblies.

8. The apparatus of claim 7 wherein said intermediate walls and said intermediate plates include means for producing turbulence in said second fluid in said contact chambers as said second fluid flows across said tubular membranes in said contact chambers.

9. The apparatus of claim 8 wherein said means for producing turbulence comprise said intermediate walls and said intermediate plates having a wavy configuration.

10. The apparatus of claim 4 wherein said tubular membranes are longitudinally disposed in said contact chambers to extend between said first and second ends of said frame assemblies, and wherein said fluid communication means provides fluid communications between said contact chambers at an end of said frame assemblies so that said second fluid is conducted through each of said contact chambers substantially along the length of said tubular membranes from one of said first and second ends to the other of said first and second ends.

11. The apparatus of claim 10 wherein said inlet means for said first fluid comprises a central distribution chamber in said first end fitting and a plurality of individual distribution ducts each of which communicates with said tubular membranes of one of said frame assemblies at one end and with said central distribution chamber at said other end.

12. The apparatus of claim 11 wherein said outlet means for said first fluid comprises a collection chamber in said second end fitting and a plurality of individual collection ducts each of which communicates with said tubular membranes of one of said frame assemblies at one end and with said central collection chambers at said other end.

13. The apparatus of claim 12 wherein said one cover plate adjacent to said first outer frame assembly includes a fluid communication duct for providing fluid communication from said inlet means for said second fluid to said contact chamber of said first outer frame assembly at said second end of said stacked frame assemblies, wherein said other cover plate adjacent to said second outer frame assembly includes a fluid communication duct for providing fluid communication from said contact chamber of said second outer frame assembly at said first end of said stacked frame assembly to said outlet means for said second fluid, and wherein said fluid communication means includes means providing fluid communication from said first end of said frame assemblies to said second end of the adjacent frame assembly so that said second fluid is conducted through each of said contact chambers of said stacked frame assemblies from said first outer frame assembly to said second outer frame assembly by flowing through each of said contact chambers of said frame assemblies substantially along said tubular membranes from said second end of said frame assembly to said first end of said frame assembly.

14. The apparatus of claim 3 wherein said inlet means for said first fluid comprises a central distribution chamber in said first end fitting and a plurality of individual distribution ducts each of which communicates with said tubular membranes of one of said frame assemblies at one end and with said central distribution chamber at said other end.

15. The apparatus of claim 14 wherein said outlet means for said first fluid comprises a collection chamber in said second end fitting and a plurality of individual collection ducts each of which communicates with said tubular membranes of one of said frame assemblies at one end and with said central collection chambers at said other end.

16. The apparatus of claim 15 wherein said sealing means comprises gasket seals between adjacent frame assemblies for sealing said contact chambers from said tubular membranes, and end fitting gasket seals for each of said distribution and collection ducts between said end fittings and said stacked frame assemblies, said end fitting gasket seals sealing said tubular membranes of respective frame assemblies from one another.

17. The apparatus of claim 16 wherein said central distribution and collection chambers of said first and second end fittings are arranged in a direction transverse to the longitudinal direction of said tubular semi-permeable membranes.

18. Apparatus for selectively separating matter between a first fluid and a second fluid through semi-permeable membranes, said apparatus comprising:
a plurality of elongated frame assemblies each of which has a first end and a second end and each of which defines an elongated contact chamber for said second fluid;
a plurality of tubular semi-permeable membranes for said first fluid for each of said frame assemblies, said pluralities of tubular membranes being disposed in said contact chambers of said frame assemblies;
said frame assemblies being stacked with said elongated contact chambers being in side by side relationship and with said first ends of said frame assemblies arranged at a first end of said stacked frame assemblies and said second ends of said frame assemblies arranged at a second end of said stacked frame assemblies;
fluid communication means for said stacked frame assemblies for providing fluid communication between said contact chambers of said frame assemblies through which said second fluid is adapted to be conducted;
a pair of cover plates for said stacked frame assemblies, said cover plates being disposed on opposite sides of said stacked frame assemblies and each having a first end arranged adjacent said first end of said stacked frame assemblies and a second end arranged adjacent said second end of said stacked frame assemblies;
sealing means for sealing said tubular semi-permeable membranes from said contact chambers so that there is no contact between said first fluid and said second fluid;
a first end fitting encompassing the outer periphery of said stacked frame assemblies at said first end of said stacked frame assemblies and a second end fitting encompassing the outer periphery of said stacked frame assemblies at said second end of said stacked frame assemblies, said first end fitting and said second end fitting each including means for clamping said stacked frame assemblies between said pair of cover plates to hold said stacked frame assemblies together, said means for clamping said frame assemblies together comprising elongated legs on each of said first and second end fittings which extend along the outside surface of the elongated sides of said frame assemblies of said stacked frame assemblies and which engage said pair of cover plates to hold said cover plates together;
inlet means for said first fluid for introducing said first fluid into said tubular semi-permeable membranes and outlet means for said first fluid for withdrawing said first fluid from said tubular semi-permeable membranes;
inlet means for said second fluid for introducing said second fluid into at least one of said contact chambers; and
outlet means for said second fluid for withdrawing said second fluid from said contact chambers whereby said second fluid is conducted substantially throughout said contact chambers of said stacked frame assemblies around said tubular semi-permeable membranes supported therein to selectively separate matter between said first and second fluids.

19. The apparatus of claim 18 wherein said elongated legs of each of said first and second end fittings extend along the outside surface of said stacked frame assemblies a distance approximately equal to one half the elongated length of said stacked frame assemblies.

20. The apparatus of claim 19 wherein said pair of cover plates are transparent.

* * * * *